US010935855B2

(12) United States Patent
Kim et al.

(10) Patent No.: US 10,935,855 B2
(45) Date of Patent: Mar. 2, 2021

(54) LIQUID CRYSTAL DISPLAY DEVICE

(71) Applicant: LG Display Co., Ltd., Seoul (KR)

(72) Inventors: Jin-Sam Kim, Paju-si (KR); Hun-Jong Lee, Goyang-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/424,256

(22) Filed: May 28, 2019

(65) Prior Publication Data
US 2020/0209693 A1 Jul. 2, 2020

(30) Foreign Application Priority Data
Dec. 31, 2018 (KR) ........................ 10-2018-0174154

(51) Int. Cl.
G02F 1/136 (2006.01)
G02F 1/1362 (2006.01)
G02F 1/1335 (2006.01)
G02F 1/1343 (2006.01)

(52) U.S. Cl.
CPC .. *G02F 1/136204* (2013.01); *G02F 1/133528* (2013.01); *G02F 1/134309* (2013.01); *G02F 1/136209* (2013.01); *G02F 1/136277* (2013.01); *G02F 1/136286* (2013.01); *G02F 2201/121* (2013.01); *G02F 2201/123* (2013.01); *G02F 2202/22* (2013.01)

(58) Field of Classification Search
CPC ................................................. G02F 1/136204
See application file for complete search history.

(56) References Cited

U.S. PATENT DOCUMENTS

| 8,426,230 | B2 | 4/2013 | Lee |
| 10,459,273 | B2 | 10/2019 | Park et al. |
| 10,571,763 | B2 | 2/2020 | Cao et al. |
| 2012/0305947 | A1 | 12/2012 | Lee |
| 2018/0095316 | A1* | 4/2018 | Park ...................... G02F 1/1343 |
| 2018/0095318 | A1 | 4/2018 | Pyo et al. |
| 2019/0155112 | A1* | 5/2019 | Cao .................. G02F 1/136286 |
| 2020/0209693 | A1 | 7/2020 | Kim et al. |

FOREIGN PATENT DOCUMENTS

| CN | 103941488 A | 7/2014 |
| CN | 105183220 A | 12/2015 |
| CN | 106169482 A | 11/2016 |
| GB | 2557403 A | 6/2018 |
| GB | 2557406 A | 6/2018 |
| JP | 2002-090720 A | 3/2002 |
| JP | 2008-176344 A | 7/2008 |
| JP | 2011-170200 A | 9/2011 |

(Continued)

OTHER PUBLICATIONS

Korean Intellectual Property Office, Office Action, KR Patent Application No. 10-2018-0174154, dated Oct. 11, 2019, nine pages (with concise explanation of relevance).

(Continued)

*Primary Examiner* — James A Dudek
(74) *Attorney, Agent, or Firm* — Fenwick & West LLP

(57) ABSTRACT

A liquid crystal display device changes a connection structure of an internal common electrode to enhance static electricity characteristics in a borderless structure, thereby enhancing reliability and yield.

20 Claims, 7 Drawing Sheets

(56) References Cited

FOREIGN PATENT DOCUMENTS

| | | |
|---|---|---|
| JP | 2012-242796 A | 12/2012 |
| JP | 2014-228565 A | 12/2014 |
| JP | 2017-116820 A | 6/2017 |
| KR | 10-2009-0032333 A | 4/2009 |
| KR | 10-2014-0072424 A | 6/2014 |
| KR | 10-2018-0036336 A | 4/2018 |
| KR | 10-2018-0036367 A | 4/2018 |
| KR | 10-2018-0077377 A1 | 7/2018 |
| KR | 10-1888422 B1 | 8/2018 |
| KR | 10-2102914 B1 | 4/2020 |
| TW | 201814470 A | 4/2018 |

OTHER PUBLICATIONS

Intellectual Property Office of the United Kingdom, GB Patent Application No. 1918689.9, dated Jun. 15, 2020, nine pages.
Taiwan Intellectual Property Office, Office Action, TW Patent Application No. 108143687, dated Jul. 14, 2020, 12 pages.
Japan Patent Office, Notice of Reasons for Refusal, JP Patent Application No. 2019-225326, dated Jan. 12, 2021, 11 pages.

\* cited by examiner

LIQUID CRYSTAL DISPLAY DEVICE

CROSS-REFERENCE TO RELATED APPLICATION

This application claims the benefit of Republic of Korea Patent Application No. 10-2018-0174154, filed on Dec. 31, 2018, which is hereby incorporated by reference as if fully set forth herein.

BACKGROUND OF THE INVENTION

Field of the Invention

The present invention relates to a display device, and more particularly, to a liquid crystal display device of a borderless structure with a thin film transistor substrate that enhances both static electricity discharge and transmittance.

Discussion of the Related Art

Along with the development of the information age, demands for display devices have increased in various forms. To meet such demands, research has been conducted on various display devices such as a liquid crystal display device (LCD), an organic light emitting display device (OLED), a plasma display panel (PDP), an electro luminescent display (ELD), and a vacuum fluorescent display (VFD), and some of these have been already applied in various devices.

Recently, the liquid crystal display device (LCD) and the organic light emitting display device (OLED) have been developed to meet the user needs. Such display devices include a thin film transistor array substrate with thin film transistors as switching devices in every pixel region. On the thin film transistor array substrate, a thin film transistor is formed at an intersection between each gate line and a data line. A pad portion connecting the gate lines and the data lines to a printed circuit board for transmitting electrical signals are provided at an edge of the thin film transistor array substrate.

A conventional display device has an edge of a display surface surrounded by a mechanism and its internal components are obstructed from view. The mechanism is formed by molding a material (e.g., plastic) different from a display surface to protrude from the display surface, and is formed with a sufficient width to occlude metals or pad portions at an edge of the display surface, and thus, the mechanism is one of the reasons for having a reduced effective display area.

In addition, the mechanism has a thickness and width to prevent exposure of a side surface of a printed circuit board connected to a pad portion, and accordingly, an entire thickness of a display device is increased. This prevents the display device from becoming slimmer.

Accordingly, there is a need to maximize an effective area of a screen, to omit mechanisms for slimming of a device, and to apply a borderless structure. However, there is a problem in that a borderless structure is vulnerable with static electricity because a mechanism is omitted from an edge of a display panel and it is difficult to configure a static electricity discharge device.

SUMMARY OF THE INVENTION

Embodiments relate to a liquid crystal display device comprising a thin film transistor (TFT) array substrate, an opposing transparent substrate, a liquid crystal layer, a plurality of first common electrodes, a plurality of pixel electrodes and a static electricity discharge electrode. The thin film transistor (TFT) array substrate has an active area with an array of pixels and a non-active area at one side of the TFT array substrate. The TFT array substrate comprising thin film transistors. The opposing transparent substrate partially overlaps the TFT array substrate. The liquid crystal layer is between the TFT array substrate and the opposing transparent substrate. The first common electrodes are on a surface of the TFT array substrate facing the liquid crystal layer. Each of the first common electrodes has a plate shape extending across a line of pixels. The pixel electrodes in each of the pixels apply an electric field in a corresponding region of the liquid crystal layer. The pixel electrodes are on the first common electrodes. The static electricity discharge electrode is on the surface of the TFT array substrate in the non-active area and is coupled to the plurality of first common electrodes.

In one or more embodiments includes an insulating film between the first common electrode and the liquid crystal layer, and pixel electrodes on the insulating film.

In one or more embodiments, the liquid crystal display device further includes a second common electrode on an insulating film between the first common electrode and the liquid crystal layer, a electrode configured to connect the first common electrodes and the static electricity discharge electrode.

In one or more embodiments, the second common electrode overlaps at least one of a common line and a data line.

In one or more embodiments, the second common electrode overlaps data lines on the active area of the TFT array substrate.

In one or more embodiments, the liquid crystal display device further comprises common lines on the active area of the TFT array substrate. The common lines are placed between the first common electrode and the second common electrode. Each of the first common electrodes connected to the second common electrode that overlaps a common line.

In one or more embodiments, the common line is on a same layer as the data line.

In one or more embodiments, the second common electrode is on a same layer as the plurality of pixel electrodes.

In one or more embodiments, the static electricity electrode is in a same layer as the first common electrodes.

In one or more embodiments, the static electricity discharge electrode is on a same layer as gate lines in the active area of the TFT array substrate.

In one or more embodiments, the liquid crystal display device further comprises a polarization plate on an opposite surface of the TFT array substrate.

In one or more embodiments, the liquid crystal display device further comprises black ink on the opposite surface of the TFT array substrate. The black ink has a thickness thinner than the polarization plate. The black ink hides the non-active area.

In one or more embodiments, the first common electrodes and the second common electrode are transparent.

Embodiments also relate to a liquid crystal display device includes a thin film transistor (TFT) array substrate, a plurality of first common electrodes, a plurality of pixel electrodes, a plurality of pixel electrodes, a second common electrode and a plurality of common lines. The FTF array substrate has an active area with an array of pixels and a non-active area at one side of the TFT array substrate. The TFT array substrate comprises thin film transistors. The first common electrodes are on a surface of the TFT array substrate. Each of the first common electrodes extend across a line of pixels. The pixel electrodes in each of the pixels apply an electric field. The pixel electrodes are on the first common electrodes. The second common electrode is on a same layer as the pixel electrodes. The common lines are between the second common electrode and the first common electrodes. The common lines overlap the second common electrode and are coupled to one or more of the first common electrode and the second common electrodes.

In one or more embodiments, the liquid crystal display device further comprises a semiconductor layer between the TFT array substrate and the common lines.

In one or more embodiments, the liquid crystal display device further comprises data lines on the semiconductor layer and in a same layer as the common lines.

In one ore more embodiments, the common lines and the data lines alternate.

In one or more embodiments, the liquid crystal display device further comprises a black matrix overlapping the second common electrode and having a width that is equal to or smaller than a width of the second common electrode.

19. The liquid crystal display device of claim 14, further comprising a static electricity discharge electrode on a surface of the TFT array substrate coupled to the plurality of first common electrodes.

In one or more embodiments, the liquid crystal display device further comprises an insulation layer between the common lines and the second common electrodes.

In one or more embodiments, the liquid crystal display device further comprises a polarization plate on an opposite surface of the TFT array substrate.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
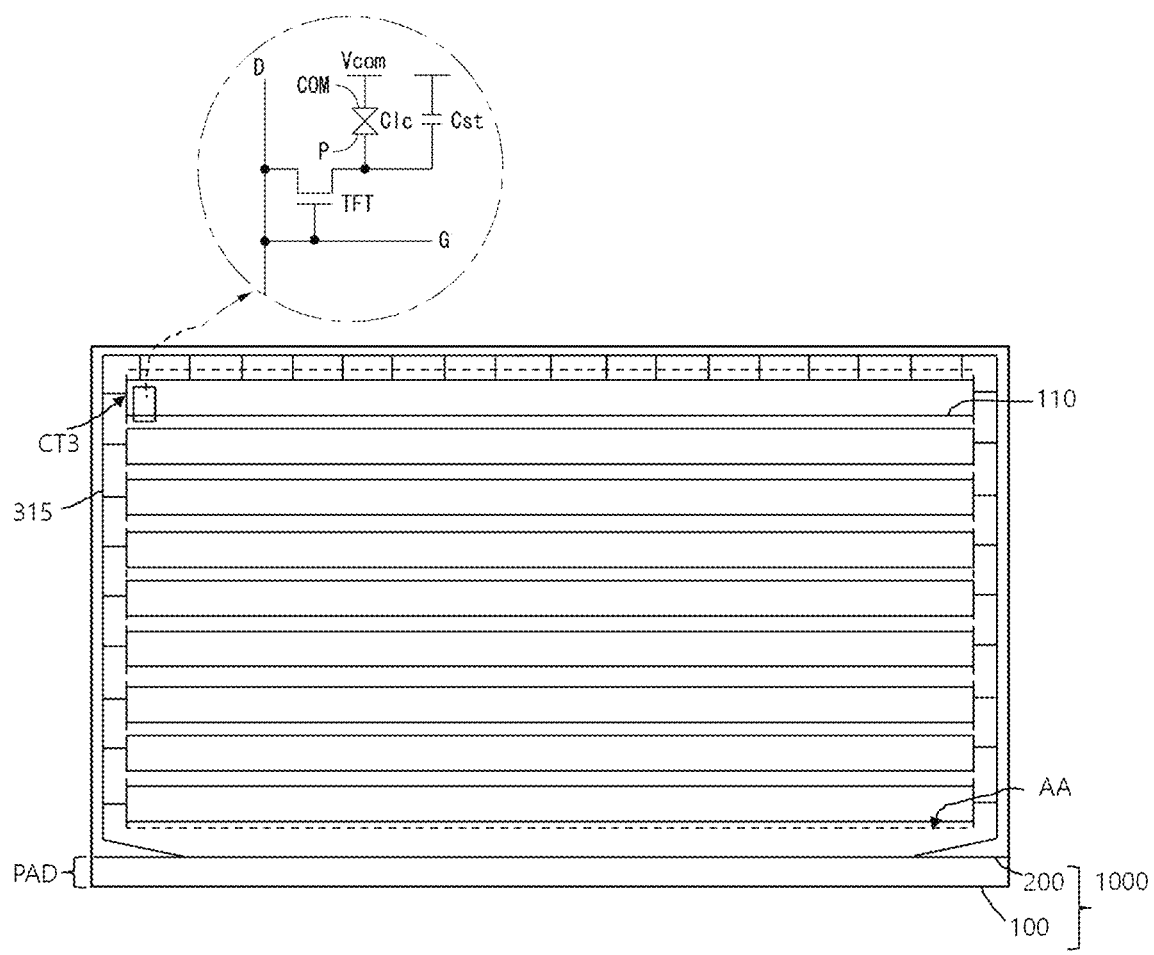
FIG. 1 is a plan view showing a liquid crystal display device according to the present invention.

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the present invention unclear. In addition, the terms of components used in the detailed description are selected in consideration of ease of description of the specification and may be different from the terms of components of an actual product.

The shapes, sizes, ratios, angles, numbers and the like disclosed in the drawings for description of various embodiments of the present invention to describe embodiments of the present invention are merely exemplary and the present invention is not limited thereto. Like reference numerals refer to like elements throughout the specification. In the following description of the present invention, a detailed description of known related art will be omitted when it is determined that the subject matter of the present invention may be unnecessarily obscured. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present invention are to be interpreted as including margins of error even without explicit statements.

With regard to the following description of the present invention, in describing positional relationships, phrases such as "an element A on an element B," "an element A above an element B," "an element A below an element B" and "an element A next to an element B," another element C may be disposed between the elements A and B unless the term "immediately" or "directly" is explicitly used.

With regard to the following description of the present invention, in describing elements, terms such as "first" and "second" are used, but the elements are not limited by these terms. These terms are simply used to distinguish one element from another. Accordingly, as used herein, a first element may be a second element within the technical idea of the present invention.

With regard to the following description of the present invention, features of various exemplary embodiments of the present invention may be partially or fully combined. As will be clearly appreciated by those skilled in the art, various interactions and operations are technically possible. Various exemplary embodiments can be practiced individually or in combination.

Figure 2:
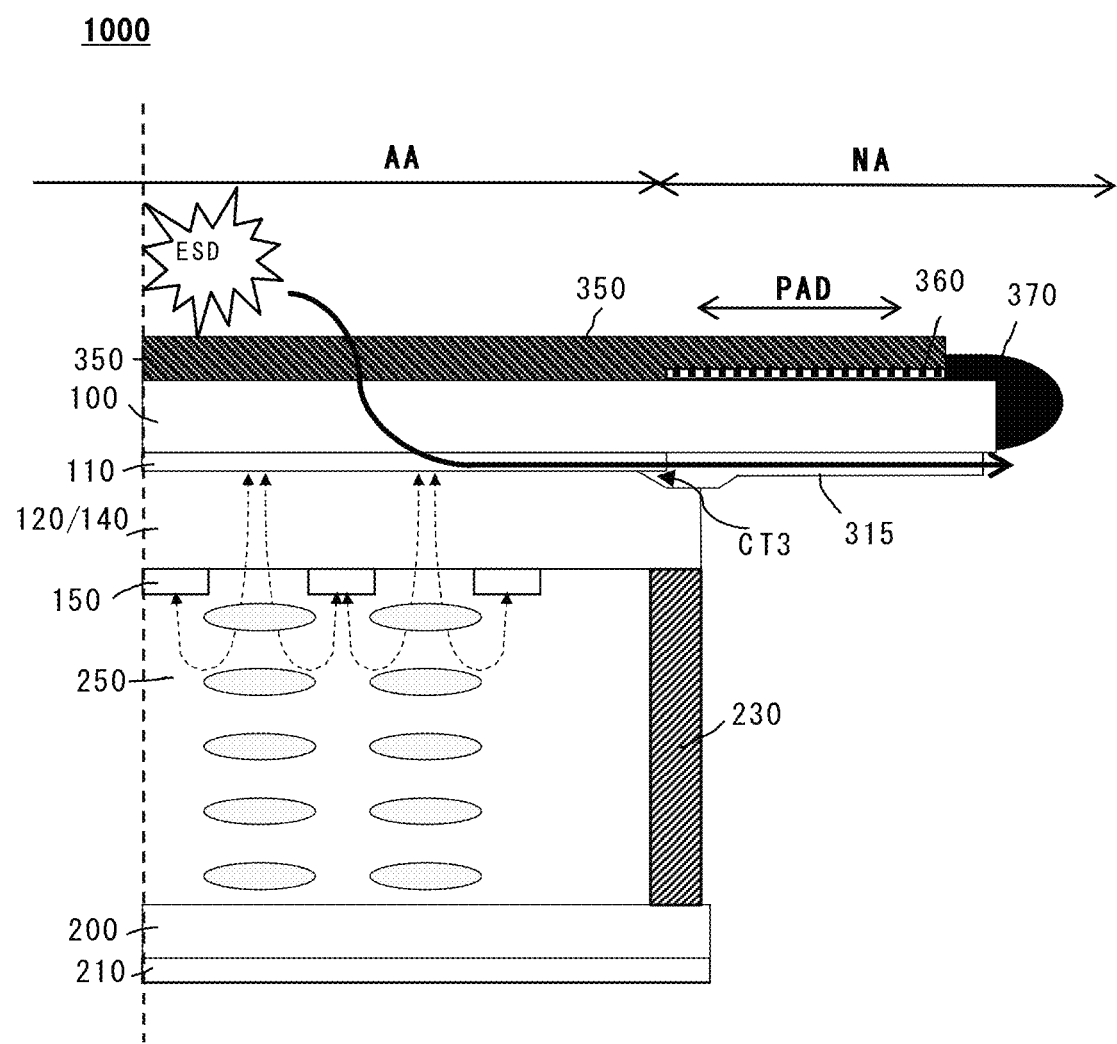
FIG. 2 is a cross-sectional view of the liquid crystal display device according to the present invention when a first substrate (thin film transistor array substrate) is disposed at an upper side.

FIG. 1 is a plan view showing a liquid crystal display device 1000 according to the present invention. FIG. 2 is a cross-sectional view of the liquid crystal display device 1000 according to the present invention when a first substrate (thin film transistor array substrate) is disposed at an upper side.

As shown in FIGS. 1 and 2, a liquid crystal display device 1000 according to the present invention may include a first substrate 100 that has an active area AA (an area within dotted lines) including a plurality of pixels and a non-active area NA around the active area. The first substrate 100 has a pad portion PAD positioned on at least one side of the non-active area. A second substrate 200 (also referred to as "opposing transparent substrate") is located below the first substrate 100 in a region except for the pad portion.

In the liquid crystal display device according to the present invention, the first substrate 100 that has a pad portion PAD and a plurality of pixels on the same plane may be a substrate on which a thin film transistor array is formed.

Light from a backlight unit (not shown) positioned below the second substrate 200 is emitted through the liquid crystal display device 1000. That is, the liquid crystal display device according to the present invention is a flip type in which the first substrate 100 with wiring faces toward viewers while the second substrate 200 is located at an opposite side below the first substrate 100.

The first and second substrates 100 and 200 may be sealed by a seal pattern 230 in a closed loop that surrounds the active area AA, and a liquid crystal layer 250 may be formed by injecting or accumulating liquid crystal in the seal pattern 230.

The liquid crystal display device 1000 according to the present invention may operate in an in-plane switching (IPS) mode in which liquid crystals are arranged in a horizontal direction when an electric field is applied to provide a high aperture ratio and a wide viewing angle. That is, the plate type of first common electrode 110 and the plurality of branched pixel electrodes 150 overlap each other in unit pixel, and when voltages are applied to the pixel electrode 150 and the first common electrode 110, respectively, an electric field may be generated by a voltage difference therebetween, and liquid crystals of the liquid crystal layer 250 may be arranged according to the electric field. According to an arrangement state of liquid crystals, a light transmittance amount may be changed to display an image.

In the liquid crystal display device 1000 according to the present invention, a plurality of unit pixels may be defined between a plurality of gate lines GLs and data lines DLs which cross each other to define a unit pixel. Horizontal pixel lines may be defined between the gate lines GL. In addition, the plate type of first common electrode 110 may be formed on each of the horizontal pixel lines. As shown in FIG. 1, the first common electrode 110 may be formed in a single number every horizontal line, or alternatively, may be divided for respective unit pixels in a horizontal line and may further include a connected part with a small width between the unit pixels.

The first common electrode 110 may further include another common electrode at a different layer to be connected to the first common electrode 110 with an electrical equipotential with the first common electrode 110.

Each unit pixel may be driven by a thin film transistor (TFT) connected to a gate line GL and a data line DL, and the liquid crystal display device may be driven by forming a horizontal electric field by the pixel electrode 150 to which a data voltage is applied and the first common electrode 110 to which a common voltage Vcom is applied. The insulating film 120/140 may be disposed between the first common electrode 110 and the pixel electrode 150.

Although the liquid crystal display device according to the present invention does not include a separate electrode for a storage capacitor, an overlap area between the pixel electrode 150 and the first common electrode 110 is sufficiently large. Thus, sufficient storage capacitor capacitance Cst may be provided by the first common electrode 110, the pixel electrode 150, and the insulating film in a unit pixel.

The first common electrode 110 of the active area AA and a static electricity discharge electrode 315 of the non-active area NA may be electrically connected through a third contact portion CT3. Although FIG. 2 illustrates direct connection between the first common electrode 110 and the static electricity discharge electrode 315, the first common electrode 110 and the static electricity discharge electrode 315 may be electrically connected through a common electrode at a different layer, having an extension portion in the non-active area NA, or the extension portion.

The liquid crystal display device 1000 according to the present invention may discharge static electricity generated during a manufacturing process of the liquid crystal display device 1000 through the first common electrode 110 of a plate type that has a large area in the active area AA and the static electricity discharge electrode 315.

The static electricity discharge electrode 315 may be connected to the pad portion PAD to receive the common voltage Vcom or be grounded. The first substrate 100 may protrude more than the second substrate 200 by an area corresponding to the pad portion PAD. A flexible printed circuit board (not shown) may be connected to the pad portion PAD and may be bent below a bottom surface of the second substrate 200.

A backlight unit (not shown) may be further disposed between a portion below the second substrate 200 and the flexible circuit board.

As shown in FIG. 1, the static electricity discharge electrode 315 may be provided at three sides except a side with the pad portion PAD. Alternatively, the static electricity discharge electrode 315 may be provided at any one number of sides. The static electricity discharge electrode 315 may branch toward each of the horizontal pixel lines and connect to the horizontal pixel lines through the third contact portion CT3 in the non-active area.

With regard to a transparent conductive film 210 at a bottom surface of the second substrate 200, which has not been described with reference to FIG. 2, static electricity generated from the liquid crystal display device during a process may be shielded through the transparent conductive film 210. The transparent conductive film 210 may perform a similar function to that of the static electricity discharge electrode 315 according to the present invention. The transparent conductive film 210 may be integrated with a bottom surface of the second substrate 200 without being patterned, and may be mainly useful to manage static electricity generated from a side of the second substrate 200.

The liquid crystal display device 1000 may further include a polarization plate 350 at a top surface of the first substrate 100 and may control linear polarization of light emitted from the bottom surface of the first substrate 100. The liquid crystal display device 1000 may further include a polarization plate (not shown) disposed on a surface on which a transparent film 210 of the second substrate 200 is disposed.

The liquid crystal display device 1000 according to the present invention may omit a mechanism such as a top case as part of a borderless structure, and instead, the edge of the first substrate 100 may be coated by silicon 370. Although a separate mechanism is not provided on a surface and lateral portion of the first substrate 100, the internal structure of the liquid crystal display device 100 may not be visible from the outside. In addition, because the mechanism may be omitted, a bottom surface of the first substrate 100 may remain flat. This prevents a difference on visibility or perceivable protrusion or difference at the edge may be prevented.

As necessary, the liquid crystal display device 1000 may further be coated with black ink 360 for hiding the non-active area NA including the pad portion PAD of the first substrate 100. In such case, the polarization plate at a bottom surface may be disposed to cover the black printing.

Although FIGS. 1 and 2 illustrate direct connection between the static electricity discharge electrode 315 and the first common electrode 110 positioned on an internal surface of the first substrate 100, the present invention is not limited thereto. An extension portion 160a (refer to FIG. 3) of a second common electrode 170c (refer to FIG. 4) with an equipotential with the first common electrode 110 and the static electricity discharge electrode 315 may be connected to each other.

The liquid crystal display device according to the present invention may use the first common electrode 110, which occupies a large area in the active area AA, or the second common electrode 170c (refer to FIG. 4) with equipotential therewith, as a static electricity discharge device, in order to discharge static electricity in a stable manner even in a structure where a non-active area outside an active area is reduced is reduced by applying a borderless structure.

Hereinafter, a liquid crystal display device according to an embodiment of the present invention will be described with reference to a detailed pixel configuration.

Figure 3:
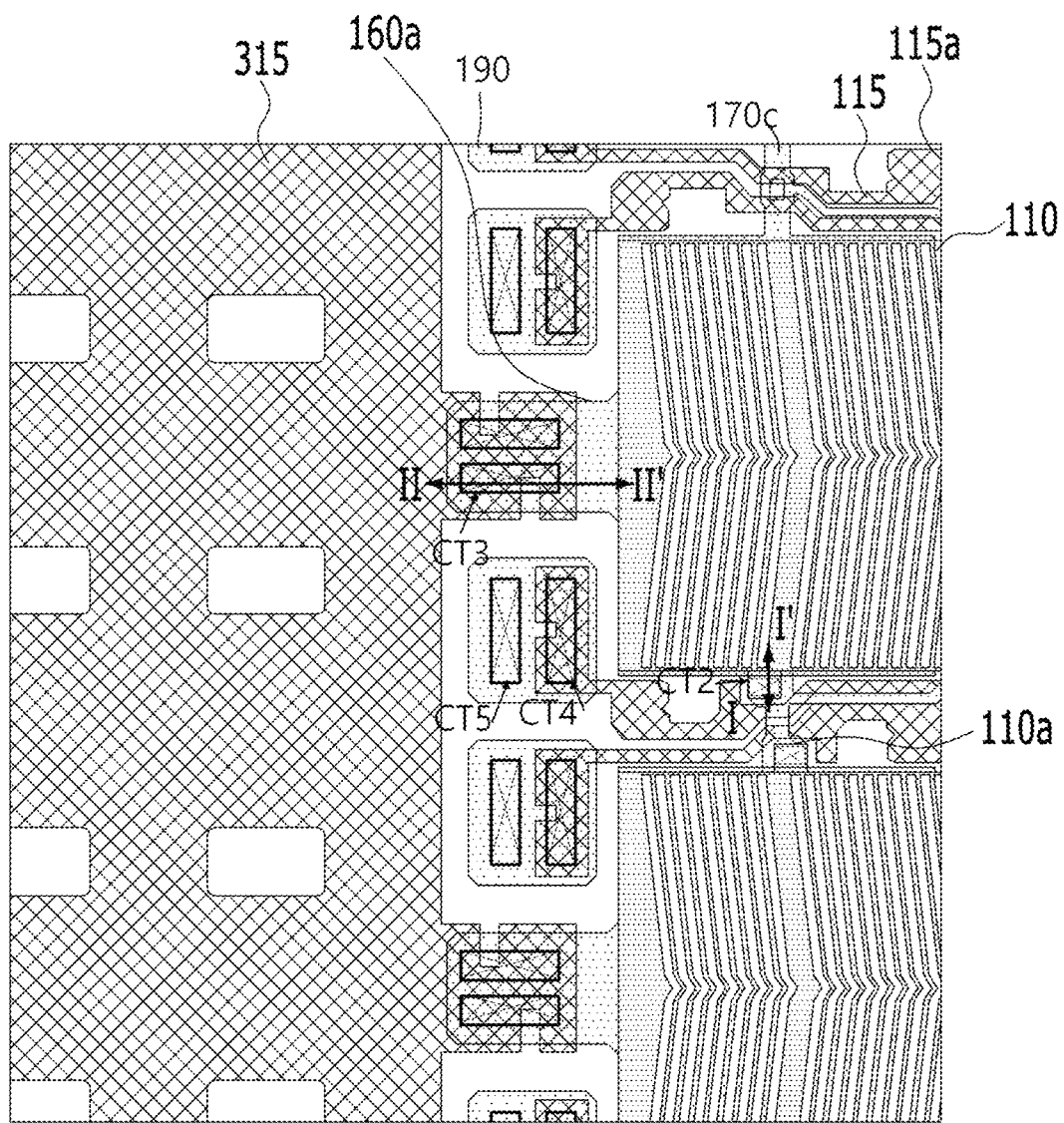
FIG. 3 is a plan view showing a boundary portion between an active area and an outer area of the liquid crystal display device according to the present invention.
Figure 4:
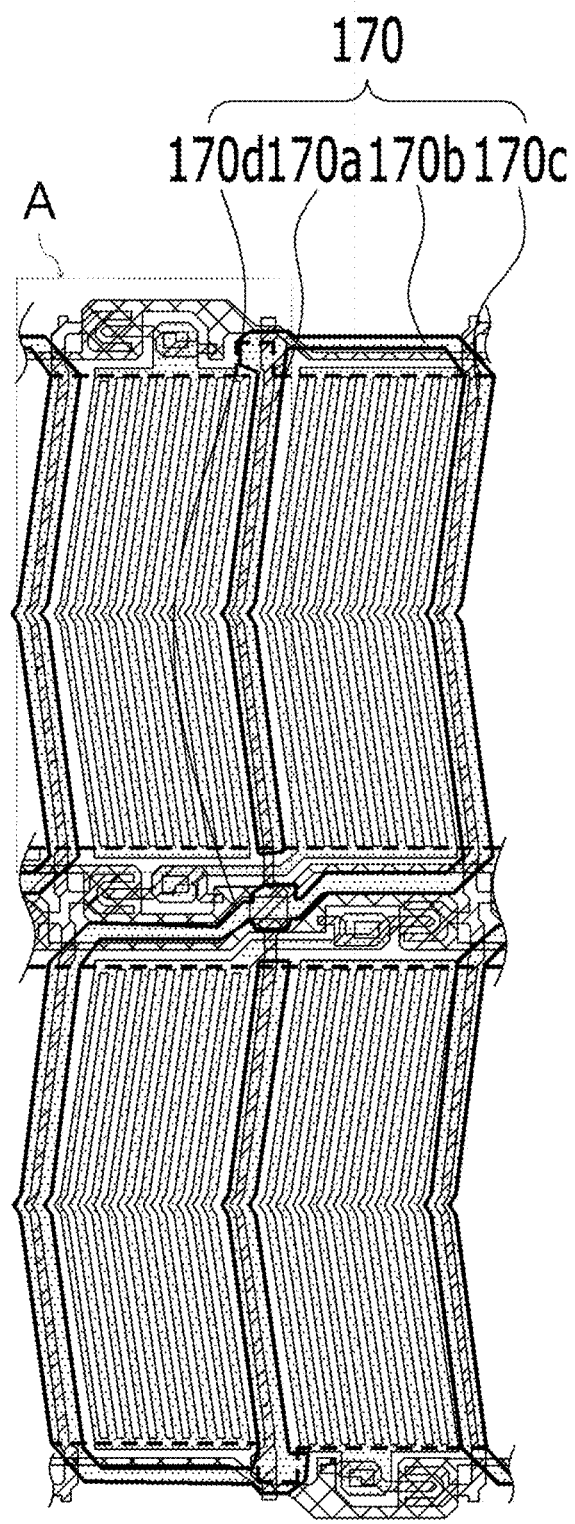
FIG. 4 is a plan view of the liquid crystal display device according to the present invention.
Figure 5:
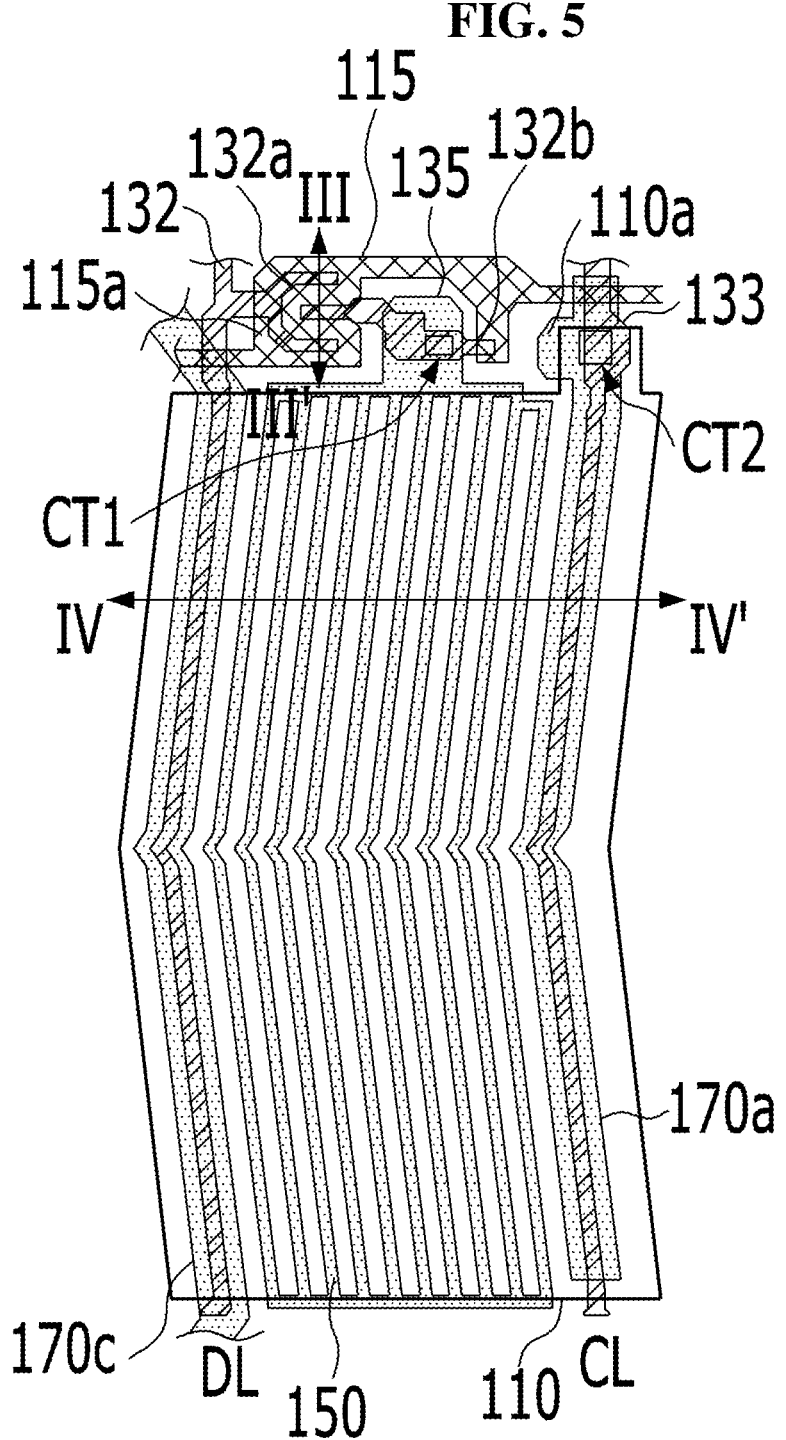
FIG. 5 is an enlarged plan view of a region A of FIG. 4.
Figure 6:
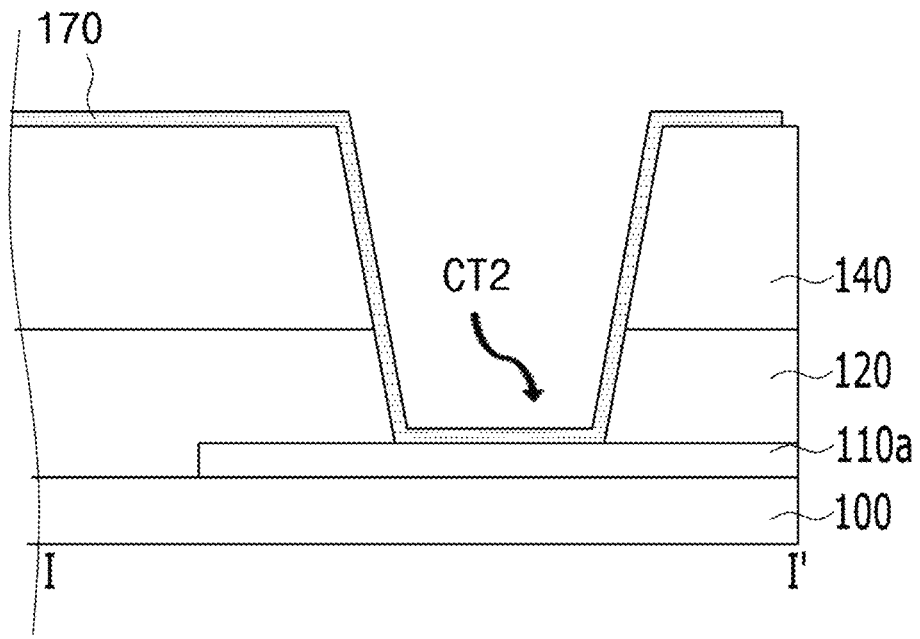
FIG. 6 is a cross-sectional view taken along I-I' of FIG. 3.
Figure 7:
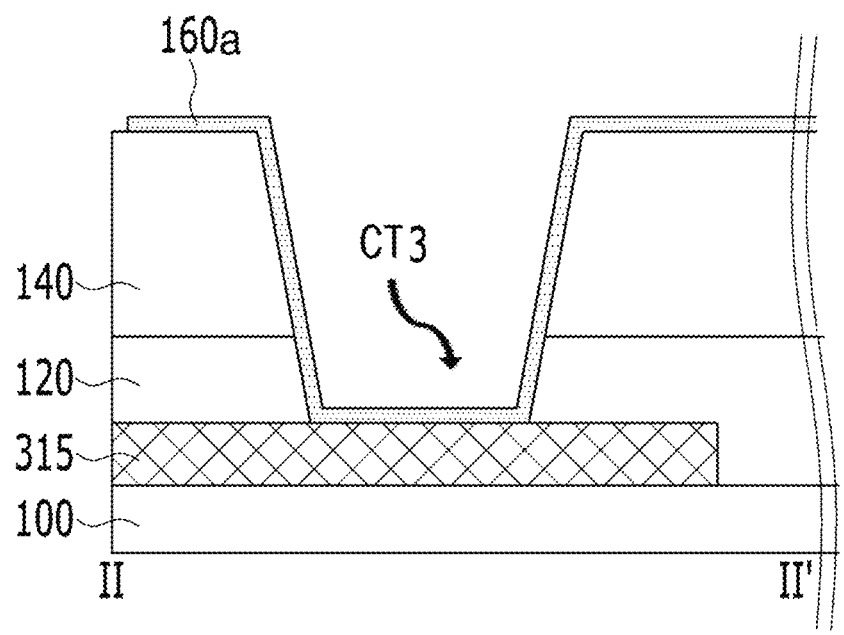
FIG. 7 is a cross-sectional view taken along II-II' of FIG. 3.
Figure 8:
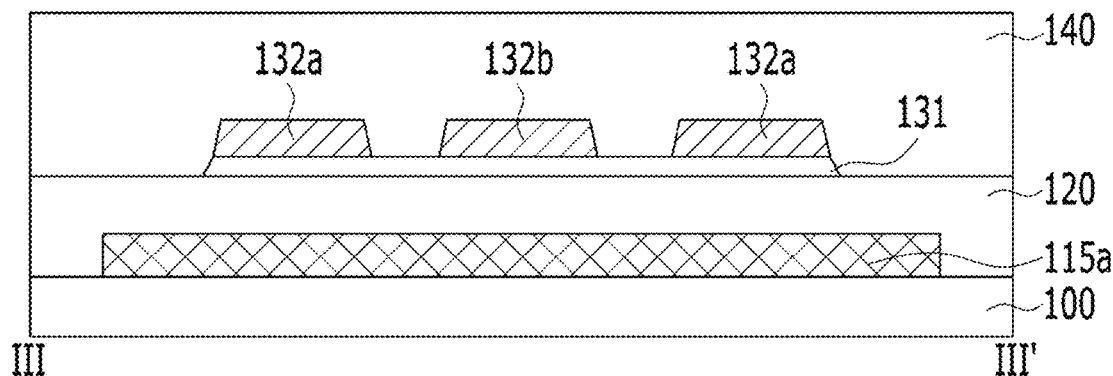
FIG. 8 is a cross-sectional view taken along of III-III' FIG. 5.
Figure 9:
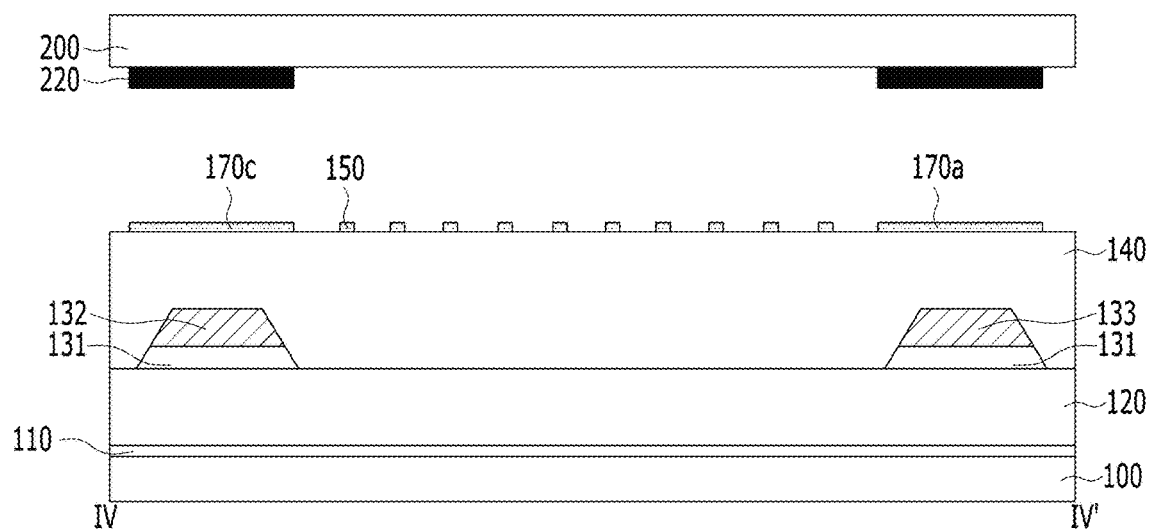
FIG. 9 is a cross-sectional view taken along IV-IV' of FIG. 5.

FIG. 3 is a plan view showing a boundary portion between an active area and an outer area of the liquid crystal display device according to the present invention. FIG. 4 is a plan view of the liquid crystal display device according to the present invention. FIG. 5 is an enlarged plan view of an indicated portion of FIG. 4. FIG. 6 is a cross-sectional view taken along I-I' of FIG. 3. FIG. 7 is a cross-sectional view taken along II-II' of FIG. 3. FIG. 8 is a cross-sectional view taken along of FIG. 5. FIG. 9 is a cross-sectional view taken along IV-IV' of FIG. 5.

As shown in FIGS. 3 through 9, the liquid crystal display device according to the present invention may include the first substrate 100 that has the active area AA including a plurality of pixels and the non-active area NA around the active area. The liquid crystal display device according to the present invention has the pad portion PAD positioned on at least one side of the non-active area. The first common electrodes 110 has a plate shape for a plurality of respective horizontal line pixels. A gate line 115 is provided between adjacent first common electrodes. A data line 132 intersects with the gate line. Pixel electrodes 150 are provided in pixel regions between the gate line 115 and the data line 132. Second common electrodes 170c connected to the first common electrode overlap the data lines 132 on the same layer as the pixel electrode. The static electricity discharge electrode 315 connected to the second common electrode extension portion 160a and discharges static electricity in the non-active area.

The static electricity discharge electrode 315 may be placed on the same layer as the gate line 115, and the static electricity discharge electrode 315 may extend to the pad portion PAD and may be connected to ground GND, or the common voltage Vcom of a phase voltage may be applied to the static electricity discharge electrode 315. The common voltage Vcom that is at a constant and continuous ground or phase voltage level may be applied to the static electricity discharge electrode 315, and thus, the first common electrode 110 connected to the static electricity discharge electrode 315 may remain at a constant common voltage or a ground voltage potential. Accordingly, static electricity generated during a process of a thin film transistor at a side of the first substrate 100 or the remaining static electricity may be discharged out of the first common electrode 110.

The static electricity discharge electrode 315 may be connected to the second common electrode extension portion 160a for each of horizontal line pixels. As necessary, for each of a plurality of horizontal line pixels, the second common electrode extension portion 160a and the static electricity discharge electrode 315 may be connected to each other through the third contact portion CT3. When a common voltage or a ground voltage is applied every horizontal line, static electricity discharge and electric field stability effects may be further enhanced.

As shown in FIGS. 4 and 5, a common line CL may be further formed on the same layer as the data line 132. In this case, the data line 132 may be disposed every two pixels and the common line CL may be disposed at a side of a pixel in which the data line 132 is not disposed. In addition, the first common electrode 110 may include an extension portion 110a and a common electrode pattern 170 configured in units of lengths of pixels to correspond to the common line CL, and the common electrode pattern 170a and the first common electrode extension portion 110a may be electrically connected through a second contact portion CT2. Alternatively, as shown in FIG. 6, the first common electrode 110 and a common electrode pattern 170a at different layers may be directly connected to each other without the common line CL. The common line CL are connected to either the common electrode 110 or the common electrode pattern 170a.

The second common electrode 170c may be formed with a larger width than the data line DL to prevent an electric field that cause a disclination line between the data line 132 and the pixel electrode 150. The second common electrode 170c and the common electrode pattern 170a may be formed in a length direction similar to the data line 132, and the same common voltage may be applied to the second common electrode 170c and the common electrode pattern 170a through electrical connection with the first common electrode 110.

The second substrate 200 may further include a black matrix 220, and the black matrix 220 may face the data line 132 that overlaps the second common electrode 170c and may have a width that corresponds to or is smaller than the second common electrode 170c.

The second common electrode 170c may prevent an unintended horizontal electric field between the data line and an adjacent pixel electrode 150 adjacent, and thus, the width of the black matrix 220 at a side of the second substrate 200 may be reduced.

In the liquid crystal display device according to the present invention, the first and second common electrodes 110 and 170c, the common electrode pattern 170a, and first and second common voltage connection patterns 170b and 170d may each be a transparent electrode, and the gate line 115 and the data line 132 may be formed of light-reflecting metal with low resistance. The transparent electrode may be, for example, indium tin oxide (ITO), indium zinc oxide (IZO), or indium tin zinc oxide (ITZO), and the light-reflecting metal with low resistance may be, for example, copper, chrome, aluminum, or noble metal such as gold, silver, or platinum.

In the liquid crystal display device according to the present invention, the pixel electrode 150 in each pixel may include a bent portion at the center of a pixel region to achieve an effect of a plurality of domains in order to compensate for a viewing angle in various directions. The pixel electrode 150 may be disposed in a diagonal direction to be symmetrical to each other based on the center of a pixel and form an acute angle with respect to an imaginary vertical line. In addition, in order to prevent the bent portion at the center of the pixel from being viewed, a bending angle with respect to a vertical line at the center may be further increased. The data line 132 may be disposed in the same or parallel direction to the pixel electrode 150, and may have the same field effect rather than being inclined toward any one pixel at opposite ends of the data line.

Although FIGS. 3 and 4 illustrate the case in which bent portions of the pixel electrode 150 are disposed in different directions, this merely illustrates a unit pixel in different forms according to another embodiments, and accordingly, both the embodiments relate to the liquid crystal display device according to the present invention and have the same feature in which the static electricity discharge electrode 315 and the second common electrode extension portion 160a are connected at the third contact portion CT3.

A thin film transistor may drive each pixel. The thin film transistor may include a gate electrode 115a integrated into the gate line 115, a source electrode 132a, and a drain electrode 132b that partially overlap each other and are spaced apart from each other. The source electrode 132a may protrude from the data line 132. In addition, the drain electrode 132b may include a first contact portion CT1 connected to a protrusion 135 of a connected part of the pixel electrode 150.

In addition, the first common electrode 110 may include the extension portion 110a at one side, and may be connected to the common electrode pattern 170a at the second contact portion CT2 to receive the same common voltage signal.

The gate line 115 may be connected to a transparent electrode island pattern 190 at one side through a fourth contact portion CT4, and may be connected to a gate voltage application pattern (not shown) connected to a gate driver included at one side of the non-active area NA to pass the transparent electrode island pattern 190 and the static electricity discharge electrode 315, through a fifth contact portion CT5. Electronical connections for signals other than ones associated with the static electricity discharge electrode 315 is omitted in FIG. 3 for the sake of brevity.

As shown in FIGS. 6 and 7, the first common electrode extension portion 110a that protrudes in each horizontal pixel line may be electrically connected to the common electrode pattern 170a that overlaps the first common electrode extension portion 110a, through the second contact portion CT2. In addition, the second common electrode pattern 170c that are on the same layer as the common electrode pattern 170a may include the second common electrode extension portion 160a that protrudes in the non-active area NA and overlaps the static electricity discharge electrode 315, and may be electrically connected to the static electricity discharge electrode 315 through the third contact portion CT3 between the second common electrode extension portion 160a and the second common electrode 170c.

That is, in the liquid crystal display device according to the present invention, the first common electrode 110 at the lowermost portion may be electrically connected to the common electrode pattern 170a through the first common electrode extension portion 110a. As shown in FIGS. 4 and 5, the common electrode pattern 170a may be connected to the second common electrode 170c that are on the same layer as the common electrode pattern 170a, the first common electrode connection pattern 170b that is connected to and cross the gate line 115 in a direction thereof in an inverted 'U' shape through an edge of a pixel, and the second common electrode 170c that overlaps the data line DL of a pixel that is shifted in a left or right direction in a next pixel line through the second common electrode connection pattern 170d.

According to another embodiment, each of the second common electrode 170c and the common electrode pattern 170a may overlap the data lines DL and 132 and the common line 133 and may be formed in parallel to each other, the common electrode pattern 170a may divide every pixel unit to have a connected part CT above or below an edge of a pixel, and the second common electrode 170c may extend in in a longitudinal direction of the data lines DL and 132 to be directly connected to the first common electrode 110 or the static electricity discharge electrode 315 at the edge.

In addition, the second common electrode 170c may be connected to the static electricity discharge electrode 315 formed of low-resistance metal in a non-active area through the extension portion 160a. The static electricity discharge electrode 315 may be connected to the pad portion PAD to directly receive a common voltage or a ground voltage signal, and may stabilize electric potential the second common electrode 170c, the common electrode pattern 170a, and the second common electrode 170c, connected to the static electricity discharge electrode 315, and thereby discharge static electricity.

In the liquid crystal display device according to the present invention, an edge of a top surface of the first substrate 100 may be printed with black ink, and the black ink may have a smaller thickness than the polarization plate 350.

The polarization plate 350 may partially cover the black ink.

The static electricity discharge electrode 315 may be on the same layer as, for example, the gate line 115. However, the present invention is not limited thereto, and the static electricity discharge electrode 315 may be replaced with any electrode as long as the electrode is positioned in the non-active area NA and is connected with the pad electrode with low resistance. As another example, the static electricity discharge electrode 315 may also be formed on the same layer as the source/drain electrode.

The static electricity discharge electrode 315 may extend toward the pad portion PAD and may be grounded. The static electricity discharge electrode 315 may be positioned in a non-active area of the first substrate 100, and for example, may be formed along a side of the first substrate 100. Accordingly, the static electricity discharge electrode 315 may have a larger area than a pixel to effectively discharge and disperse static electricity charge.

For a uniform dispersion effect for each region, the static electricity discharge electrode 315 may be connected to the second common electrode extension portion 160a with respect to each of horizontal line pixels.

Hereinafter, a method of manufacturing a thin film transistor array on a first substrate of a liquid crystal display device according to the present invention will be described with reference to FIGS. 3 to 9.

Referring to FIGS. 3 to 9, a transparent conductive material may be formed on the first substrate 100 and may be selectively removed to form the first common electrodes 110 that cross respective horizontal pixel lines and include the first common electrode extension portion 110a.

Then, a light-reflecting metal material may be deposited and may be selectively removed to form the gate line 115 in a horizontal line direction, and the gate electrode 115a, which is integrated with the gate line 115 and has a predetermined width, in an the active area AA. Simultaneously, the static electricity discharge electrode 315 may be formed of the same material as the light-reflecting metal material to be adjacent to at least one side of the non-active area NA, i.e., horizontal pixel lines, in the non-active area NA.

Then, a gate insulating film 120 may be formed on an entire surface of the first substrate 100.

Then, a semiconductor layer material (which is the same layer as the semiconductor layer 131) and a light-reflecting metal material (which is the same layer as the data line 132) may be sequentially stacked, and then, selectively removed to leave the data line 132 in a direction that crosses the gate electrode 115a, and patterns (which are portions for forming the source electrode 132a and the drain electrode 132b) that are formed in a shape of the semiconductor layer 131 of a thin film transistor to be integrated with the data line 132 and overlap the gate electrode 115a. As shown in the drawings, to reduce the number of applied data voltage level, the data line 132 and a common line CL may be alternately formed on the same layer, as described above.

The light-reflecting metal material may be selectively removed at a portion corresponding to a channel region at an intersection with the gate electrode 115a to expose a channel portion of the semiconductor layer 131. During this procedure, the source electrode 132a in an integrated type, e.g., a 'C' shape (refer to FIGS. 3 and 6) and the drain electrode 132b configured to have a channel region inside the source electrode 132a in a 'C' shape may be formed on the same layer as the data line 132. The drain electrode 132b may have one side that partially protrudes toward an internal portion of the 'C' shape of the source electrode 132a and extends toward the gate line 115.

Then, the interlayer insulating layer 140 may be formed on the gate insulating film 120 to cover the data line 132, the source electrode 132a, and the drain electrode 132b.

Then, a transparent conductive material may be deposited and may be selectively removed to form the plurality of branched pixel electrodes 150 that are connected to the drain electrode 132b in a pixel region that is defined as a space between the gate line 115 and the data line 132. The second common electrode 170c that overlaps the data line 132 may be formed on the same layer as the pixel electrodes 150, and when there is a region between pixels in a vertical line in which the data line 132 is not disposed on the same layer as the second common electrode 170c, the common electrode pattern 170a may be further formed in the region. In addition, when a common electrode has a shape illustrated in FIG. 4, the first common electrode connection pattern 170b that is connected in a horizontal direction between the common electrode pattern 170a and the second common electrode 170c, and the second common electrode connection pattern 170d for connecting the second common electrodes 170c that are adjacent to each other in up and down directions and overlap the data line DL may be further formed.

FIGS. 8 and 9 and the aforementioned manufacturing method are given based on the case in which the semiconductor layer 131 and the data line 132 are formed using the same mask, but as necessary, the semiconductor layer 131 and the data line 132 may be formed using respective different masks. When the same mask is used, the data line 132 and the semiconductor layer 131 (refer to FIGS. 8 and 9) below a portion in which metal for forming the data line 132 is positioned may be configured, and when different masks are used, a semiconductor layer may be omitted below the data line 132. When the same mask is used, a yield may be advantageously enhanced along with increase in the number of masks, and when different masks are used, a position of a semiconductor layer may be advantageously adjusted irrespective of a data line metal layer.

In a borderless structure of the liquid crystal display device according to the present invention, when a thin film transistor array substrate is positioned at an upper side, a bottom surface of the thin film transistor array substrate is directed toward the viewer eye, and thus, it may not be possible to attach a separate static electricity preventing device. In the liquid crystal display device according to the present invention, a common electrode that occupies a large area in an active area may be connected to a metal electrode of a non-active area and may be used as a static electricity prevention device.

It is not necessary to prepare a specific region for the static electricity prevention device, and thus, even if a specific device at a bottom surface of a substrate is not added or the non-active area is not increased, static electricity may be effectively discharged.

In addition, a common electrode may be split to a first common electrode with a large area close to a surface of a substrate and a second common electrode that covers a width of a data line, and thus, a disclination line between the data line and an adjacent pixel electrode may be prevented and light leakage due to the disclination line may be prevented. Accordingly, it is not necessary to form a black matrix with a larger width than a width of the data line, and thus, an aperture ratio may be ensured.

The liquid crystal display device according to the present invention may have the following effects.

First, in a borderless structure, when a thin film transistor array substrate is positioned at an upper side, a bottom surface of the thin film transistor array substrate is directed toward the viewer eye, and thus, it may not be possible to attach a separate static electricity preventing device. In the liquid crystal display device according to the present invention, a common electrode that occupies a large area in an active area may be connected to a metal electrode of a non-active area and may be used as a static electricity prevention device.

Second, it is not necessary to prepare a specific region for the static electricity prevention device. Even if a specific device at a bottom surface of a substrate is not added or the non-active area is not increased, static electricity can be discharged effectively.

Third, a common electrode may be halved to a first common electrode with a large area close to a surface of a substrate and a second common electrode that covers a width of a data line, and thus, a disclination line between the data line and an adjacent pixel electrode may be prevented and light leakage due to the disclination line may be prevented. Accordingly, it is not necessary to form a black matrix with a larger width than a width of the data line, and thus, an aperture ratio may be ensured.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A liquid crystal display device, comprising:
a thin film transistor (TFT) array substrate having an active area with an array of pixels and a non-active area at one side of the TFT array substrate, the TFT array substrate comprising thin film transistors;
an opposing transparent substrate partially overlapping the TFT array substrate;
a liquid crystal layer between the TFT array substrate and the opposing transparent substrate;
a plurality of first common electrodes on a surface of the TFT array substrate facing the liquid crystal layer, each of the first common electrodes having a plate shape extending across a line of pixels;

a plurality of pixel electrodes in each of the pixels to apply an electric field in a corresponding region of the liquid crystal layer, the plurality of pixel electrodes on the first common electrodes; and a static electricity discharge electrode on the surface of the TFT array substrate in the non-active area and coupled to the plurality of first common electrodes, wherein the static electricity discharge electrode is on a same layer as gate lines in the active area of the TFT array substrate.

2. The liquid crystal display device of claim 1, further comprising:

an insulating film between the first common electrode and the liquid crystal layer, wherein the pixel electrodes are on the insulating film.

3. The liquid crystal display device of claim 2, further comprising a second common electrode on an insulating film between the first common electrodes and the liquid crystal layer, and an electrode configured to connect the first common electrodes and the static electricity discharge electrode.

4. The liquid crystal display device of claim 3, wherein the second common electrode overlaps at least one of a common line and a data line.

5. The liquid crystal display device of claim 3, wherein the second common electrode overlaps data lines on the active area of the TFT array substrate.

6. The liquid crystal display device of claim 5, further comprising common lines on the active area of the TFT array substrate, the common lines placed between the first common electrodes and the second common electrode, each of the first common electrodes connected to the second common electrode that overlaps at least one of the common lines.

7. The liquid crystal display device of claim 4, wherein the common line is on a same layer as the data line.

8. The liquid crystal display device of claim 3, wherein the second common electrode is on a same layer as the plurality of pixel electrodes.

9. The liquid crystal display device of claim 1, wherein the static electricity discharge electrode is in a same layer as the first common electrodes.

10. The liquid crystal display device of claim 1, further comprising black ink on the opposite surface of the TFT array substrate, the black ink having a thickness thinner than the polarization plate, the black ink configured to hide the non-active area.

11. The liquid crystal display device of claim 3, wherein the first common electrodes and the second common electrode are transparent.

12. A liquid crystal display device, comprising:

a thin film transistor (TFT) array substrate having an active area with an array of pixels and a non-active area at one side of the TFT array substrate, the TFT array substrate comprising thin film transistors;

a plurality of first common electrodes on a surface of the TFT array substrate, each of the first common electrodes extending across a line of pixels;

a plurality of pixel electrodes in each of the pixels to apply an electric field, the plurality of pixel electrodes on the first common electrodes;

a second common electrode on a same layer as the pixel electrodes;

a plurality of common lines between the second common electrode and the first common electrodes, the common lines overlapping the second common electrode, the common lines coupled to one or more of the first common electrode and the second common electrodes; and a semiconductor layer between the TFT array substrate and the common lines.

13. The liquid crystal display device of claim 12, further comprising data lines on the semiconductor layer and in a same layer as the common lines.

14. The liquid crystal display device of claim 13, wherein the common lines and the data lines are alternate.

15. The liquid crystal display device of claim 12, further comprising a black matrix overlapping the second common electrode and having a width that is equal to or smaller than a width of the second common electrode.

16. The liquid crystal display device of claim 12, further comprising a static electricity discharge electrode on a surface of the TFT array substrate coupled to the plurality of first common electrodes.

17. The liquid crystal display device of claim 12, further comprising an insulation layer between the common lines and the second common electrodes.

18. The liquid crystal display device of claim 12, wherein the first common electrodes and the second common electrode are transparent.

19. The liquid crystal display device of claim 4, further comprising a semiconductor layer between the TFT array substrate and the common line.

20. The liquid crystal display device of claim 16, the first common electrodes are closest to the surface of the TFT array substrate in an active area and the static electricity discharge electrode is closest to the surface of the TFT array substrate in the non-active area.

* * * * *